(12) United States Patent
Arowesty et al.

(10) Patent No.: US 11,386,152 B1
(45) Date of Patent: Jul. 12, 2022

(54) AUTOMATIC GENERATION OF HIGHLIGHT CLIPS FOR EVENTS

(71) Applicant: Amazon Technologies, Inc., Seattle, WA (US)

(72) Inventors: Rahamim Rami Arowesty, Vancouver (CA); Kevin Chu, Seattle, WA (US); Lijia Yang, Seattle, WA (US); Wen Fan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 754 days.

(21) Appl. No.: 16/219,337

(22) Filed: Dec. 13, 2018

(51) Int. Cl.
*G06F 7/00* (2006.01)
*G06F 17/30* (2006.01)
*G06F 16/783* (2019.01)
*G06F 16/9536* (2019.01)
*G06F 16/2457* (2019.01)

(52) U.S. Cl.
CPC ...... *G06F 16/783* (2019.01); *G06F 16/24575* (2019.01); *G06F 16/9536* (2019.01)

(58) Field of Classification Search
CPC ............. G06F 16/783; G06F 16/24575; G06F 16/9536

USPC ......................................................... 707/736
See application file for complete search history.

(56) References Cited

U.S. PATENT DOCUMENTS

| | | | |
|---|---|---|---|
| 9,077,956 B1* | 7/2015 | Morgan | H04N 9/87 |
| 2014/0157294 A1* | 6/2014 | Chung | H04N 21/25891 725/10 |
| 2016/0105708 A1* | 4/2016 | Packard | H04N 21/23439 725/10 |
| 2018/0020243 A1* | 1/2018 | Ni | H04N 21/2187 |
| 2019/0289372 A1* | 9/2019 | Merler | H04N 21/44 |

* cited by examiner

*Primary Examiner* — Binh V Ho
(74) *Attorney, Agent, or Firm* — Kilpatrick Townsend & Stockton LLP

(57) ABSTRACT

Techniques for generating highlight clips of an event are described herein. For example, unstructured data associated with an event may be received. Audio data and video data for the event may be obtained. Structured data may be extracted from the unstructured data using one or more feature extractors. In embodiments, a duration for a highlight clip of the event may be determined based at least in part on a model that uses the structured data, the audio data and the video data of the event. Metadata that identifies the duration for the highlight clip of the event may be generated based at least in part on the model. The highlight clip of the event may be stored based at least in part on the metadata.

17 Claims, 7 Drawing Sheets

AUTOMATIC GENERATION OF HIGHLIGHT CLIPS FOR EVENTS

BACKGROUND

Live streaming content providers can enable users to explore, interact, and consume a variety of events (e.g., live sports games, live video game eSport events, live video game streaming content, etc.), and thereby explore a variety of real, virtual, or non-real (e.g., fantasy or sci-fi) environments from the safety and comfort of their own homes. Some content producers (e.g., providers of the events or live events) may generate clips or highlight clips of content to provide emphasis on certain portions of the event. For example, a highlight clip of a long touchdown pass in a football game may be provided as a replay after the pass was just completed. However, conventional content producers and highlight clip generators must generate the highlight clips manually.

BRIEF DESCRIPTION OF THE DRAWINGS

Various embodiments in accordance with the present disclosure will be described with reference to the drawings, in which.

DETAILED DESCRIPTION

Figure 1:
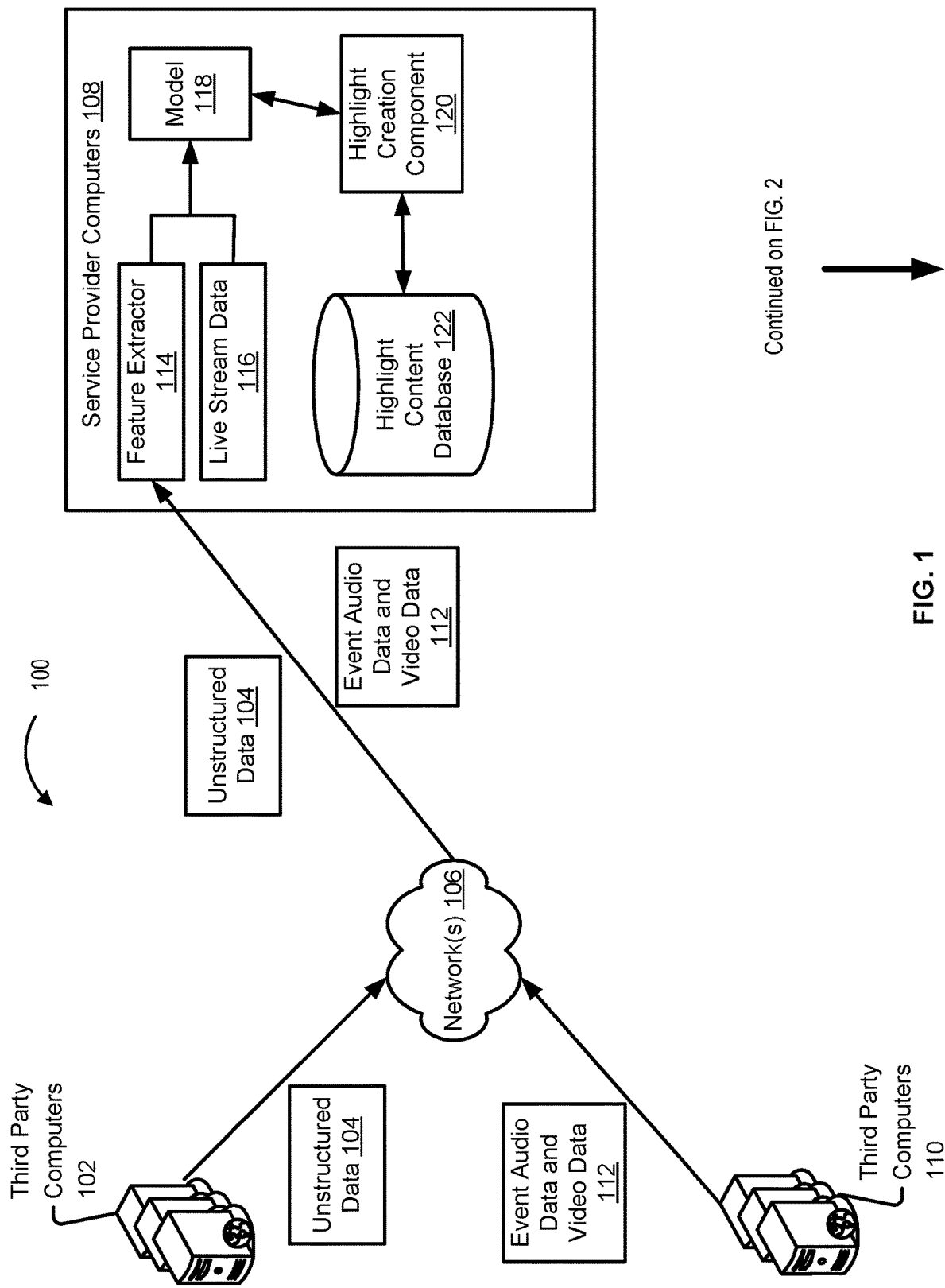
FIG. 1 illustrates an example workflow for a highlight feature in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for implementation of a highlight feature that uses signals or metrics from various data sources to automatically generate highlight clips. For example, a model can be trained using signals or metrics to determine metadata that indicates that a highlight clip should be generated for a portion of content associated with an event (e.g., a live event). The highlight feature may be implemented by service provider computers that receive or otherwise obtain unstructured data from various third party computers as well as audio data and video data of an event to analyze via a model or algorithm. In embodiments, structured data may be extracted from the unstructured data using one or more feature extractors also implemented by the service provider computers. Each feature extractor may be configured to interact and extract structured data from a particular data source. For example, one data source may correspond to sports statistic information computer (e.g., a third party computer) that provides sports statistic information. The service provider computers may implement the appropriate feature extractor to extract structured data that can be utilized by the model to determine whether a clip of content associated with the structured data should be generated.

In some examples, a "clip" can be a portion of an event that is less than the entirety of the length of the event. For example, a clip of a football game may include five seconds of a quarterback snap and handoff to a running back. Additionally, in some examples, a "highlight clip" can be a clip that presents interesting, exciting, or noteworthy portions of an event or live event. Highlight clips can include edited portions of digital media content where emphasis can be placed on a portion of the digital media content by focusing on just a portion of the content that includes the interesting, exciting, or noteworthy portions of the event or live event. For example, a highlight clip of a football game may include a 50 yard touchdown pass at the last second of the game to secure victory for one of the teams playing the football game. Conventionally, highlight clips are generated based on manual input from a user associated with recording or streaming the event. However, the highlight clips generated by the highlight feature described herein can use the structured data derived from various information sources to generate and present a highlight clip during a live event without input from a user.

In accordance with at least one embodiment, the highlight feature implemented by the service provider computers uses a model or algorithm that is configured to determine whether generation of a highlight clip is appropriate for an event by analyzing structured data from multiple information sources (e.g., third party computers). In embodiments, the model or algorithm may use the structured data and provide metadata that includes a duration (e.g., a start time point and an end time point) for the highlight clip (e.g., some subset of the digital media content). Examples of unstructured data include data that is provided by a third party computer in an unrefined form such that the particular metrics or data that the model will use may be interleaved with other non-usable information. Other examples of unstructured data include information that is not structured in a traditional row-column database format or lacks fields in a database (e.g., text and multimedia content such as email messages, videos, photos, audio files, webpages). For example, unstructured data may include social media information provided by a social media platform. The social media information may include various information such as pictures and text shared by users of the social media platform as well as hashtags used by the users when sharing content on the social media platform may be received by the service provider computers as unstructured data. In accordance with at least one embodiment, the service provider computers may extract structured data from the unstructured data that will be used by the model using one or more feature extractors. A given feature extractor may be configured to extract the hashtags as structured data that can be used by the model while discarding the rest of the information.

In a non-limiting example, a user can watch a stream (e.g., digital media content) of a live game. While streaming the content, the service provider computers can receive various data points or metrics from various information sources. Examples of this information can include hashtags from social media platforms, crowd noise information from the crowd at the live game, real-time sports statistics for players and teams participating in the live game, etc. This information can be fed into a model (machine learning model) that attempts to determine what portions of the digital media content are interesting or should be considered highlights. Based on the determination, the model may output a start time and end time for the clip to be generated. The portion of the digital media content that corresponds to the start and end times can be saved as a separate piece of media content and can be labeled as a highlight clip. This clip can be presented in a UI so that the user can view or consume the highlight at any time, for example, while the game is still playing or later.

Examples of structured data that is extracted from unstructured data used by the model of the highlight feature described herein may include social media trend information, real-time sport statistic information, crowd noise information, operator action information, or application input information. In some examples, structured data may be stored in and/or queried fields of a database or other data structure. In embodiments, social media trend information may include data provided by social media platforms such as Twitter, Facebook, Instagram, etc., that indicate a growing movement or direction of attention by users towards a particular occurrence within an event. For example, social media trend information may include the hashtag "#besttouchdownpassever," or "#can'tbelievetheymissedthatshot." Another example of social media trend information may include a sudden spike in content provided by users on the social media platform such as a sudden surge in comments on Facebook all referring to the same event. In embodiments, real-time sport statistic information may include recorded information obtained by a third party computer of a live sports event that correspond to the live sports event such as scores, player statistics, etc. For example, real-time sport statistic information may include information that identifies a number of rebounds by a particular player in a basketball game that is currently being played. The real-time sport statistic information may also include historical records of information obtained about a sports event including scores or player statistics.

Crowd noise information may include a decibel level recorded at an event that is compared to a threshold to identify a noise differential between a baseline decibel level of an event and a current decibel level of the same event. For example, usually during exciting plays or remarkable moments of an event a crowd of people may cheer or scream to indicate their excitement and also raise the decibel level of noise of an event. In embodiments, the noise differential between a baseline crowd noise decibel level and a current crowd noise decibel level can indicate an interesting data point used by the model to determine whether a highlight clip should be generated for the data point. In embodiments, the crowd noise information may include a live commentators description, tone, and contents. The operator action information may include information associated with input provided by users such as camera operator input (e.g., input associated with zooming in a camera, panning a camera (e.g., at a high speed), switching to multiple cameras to capture a certain point in a space associated with an event, etc.) as well as input provided by specific applications associated with capturing or presenting digital media content of an event. The application input information may include information provided by users utilizing tools or input mechanisms associated with user devices that are used to consume the content such as a pause function, a rewind function, or increasing a volume of a presentation of digital media content. In embodiments, third party computers that obtain the application input information may provide it to the service provider computers for analysis by the model or the service provider computers can request and access the application input information directly from user devices.

In accordance with at least one embodiment, the model implemented by the service provider computers for the highlight feature may aggregate the extracted structured data for an event and compare the aggregated structured data to identify trends that indicate a highlight should be created for some activity or occurrence that occurred during the event. For example, the social media trend information may indicate that a number of users just provided comment posts on a social media platform and all used the same hashtag, while the real-time sports statistic information indicates a spike in quarterback tackles for a certain football team. In accordance with at least one embodiment, the model may also use one or more thresholds to compare each structured data point to determine whether a highlight of an event corresponding to the received structured data should be generated (e.g., generate the metadata that identifies at least a duration of the highlight clip using the audio data and video data for the event). For example, the model may use one particular threshold when analyzing crowd noise information for a football game to determine that a current crowd decibel level for the event has surpassed a threshold and therefore is indicative of an exciting play of the football game. The model may utilize a different threshold when analyzing structured data of a crowd noise information for a golf game than it would utilize for a soccer game. In accordance with at least one embodiment, the service provider computers may select a particular model for analyzing structured data for a certain type of event from one or more models maintained by the service provider computers and associated with the highlight feature. For example, one model may be utilized for golf games along with associated thresholds while another model and associated thresholds may be utilized for baseball games or video game eSports events.

In accordance with at least one embodiment, the service provider computers may transmit or provide the highlight clips to user devices of users viewing digital media content corresponding to an event. The interaction or lack of interaction with the highlight clip transmitted to a user device of a user can be used to update the model in analyzing subsequent structured data for the same event or a similar event and determining whether a highlight clip should be generated for the digital media content corresponding to the event. In embodiments, the metadata generated by the model may also include other information than a duration for the highlight clip such as a type of the highlight clip, a description for the highlight clip, associated information of the event or live event such as a current score, etc. The processes and systems described herein may be an improvement over conventional content streaming platforms, broadcasting software, and highlight generation processes. For example, conventional highlight generation systems use input from content creators to generate highlights at their own discretion without any input from other information resources and without knowledge of the viewers preferences. Further, conventional highlight generation systems generally create highlights after a live event is over or complete. Systems and methods described herein use data from multiple information resources to determine that a highlight clip should be generated for digital media content that corresponds to an event as the event is occurring. The service provider computers implementing the highlight feature can learn and update a model using the obtained structured data as well as user feedback to create highlights that are appropriate given a type of event that is associated with the structured data. For example, the systems of the current disclosure may generate a short highlight clip for a crushing tackle of a quarterback in a football game that is only five seconds long. However, the same system may generate a clip for a soccer game that is of a length of 30 seconds and includes great passes between forwards of a soccer team from one end of the field to the other and results in a goal. Users consuming digital media content of events can save time looking for particular highlights and instead can access highlights generated by the service provider computers and presented to associated user devices or stored in a database for access at any time after they are generated.

FIG. 1 illustrates an example workflow for a highlight feature in accordance with at least one embodiment. The workflow 100 of FIG. 1 includes third party computers 102 transmitting unstructured data 104, via networks 106 to service provider computers 108. The service provider computers 108 may implement the highlight feature described herein. In embodiments, a third party computer of the third party computers 102 may be associated with a particular information resource. For example, a given third party computer may be associated with a particular social media platform (Facebook) or a particular sports statistic recording system (ESPN). FIG. 1 also includes third party computers 110 providing event audio data and video data 112 via networks 106 to the service provider computers 108. In embodiments, the service provider computers 108 may be configured to associate or determine that the unstructured data 104 provided by third party computers 102 is associated with the event audio data and video data 112 provided by third party computers 110. For example, the feature extractor 114 may be configured to compare information obtained from the event audio data and video data 112 such as a description of the event audio data and video data 112 to a description associated with the unstructured data 104.

In accordance with at least one embodiment, the feature extractor 114 may be configured to extract structured data from the unstructured data 104. In embodiments, the service provider computers 108 may utilize a different feature extractor 114 for each different type of unstructured data 104. The service provider computers 108 may correlate the structured data from the feature extractor 114 with the live stream data 116. For example time stamps or time information associated with the event audio data and video data 112 may be compared to time stamps or time information associated with the unstructured data 104. In embodiments, the service provider computers 108 may utilize a model 118 to analyze the structured data generated by the feature extractor 114 and determine whether to generate metadata for use in generating a highlight clip for digital media content that corresponds to the event associated with the unstructured data 104 and event audio data and video data 112. In accordance with at least one embodiment, the metadata may include details or other information about the content (live stream data 116). For example, the metadata may include information that describes a type of highlight clip (e.g., score versus injury clip), information from the event such as a score or teams playing, as well as a rating for a data point or data extracted by the feature extractor 114. In embodiments, each structured data point may be ranked or have a score generated by the model 118 that represents an intensity or relevance of the particular structured data point in comparison to the other structured data points. For example, crowd noise information from a particular geographic location may indicate that it is very loud even compared to the normal loud baseline noise level for the geographic location for this type of event (e.g., a specific venue for a particular event type). In accordance with at least one embodiment, the highlight creation component 120 may utilize the rank or score associated with the metadata or structured data associated with the metadata and live stream data 116 to generate a highlight clip or recommend a highlight clip to a user. In embodiments, the ratings or scores may be aggregated into a combined score or rating that represents a potential interest of the highlight to a user. For example, given high scores or ratings for several structured data points a highlight clip may have a high rating which indicates that most users would be interested in this particular highlight clip.

As described herein, the model 118 may use one or more thresholds to compare each piece of structured data to determine whether a highlight is appropriate as well as aggregate the structured data to analyze as a whole that the unstructured data 104 provided by third party computers 102 indicates a signal for generating a highlight clip for digital media content that corresponds to an associated event. For example, the alignment of social media trend information indicating a spike in hashtags for an event as well as large crowd noise decibel level spike for the event may indicate that a highlight clip is appropriate for some particular activity or occurrence in the event. In embodiments, the model 118 may use thresholds associated with a type of event including the content of the event or circumstances around the event such as a finals game versus an everyday game or event. Thresholds may also be associated with geographic locations of events. For example, a particular thresholds may be utilized when analyzing structured data provided from a particular geographic location that is associated with loud crowd noises regularly. In accordance with at least one embodiment, the highlight creation component 120 of the service provider computers 108 may be configured to generate a highlight for the digital media content correspond to the event that is associated with the event audio data and video data 112 and the unstructured data 104 based at least in part the metadata generated by the model 118. In embodiments, the highlight creation component 120 may be configured to modify or edit the highlight clip such as by applying effects (e.g., different lighting, slow-motion replay, etc.).

The service provider computers 108 may store and maintain generated highlight clips in a highlight content database 122 for retrieval and/or provision to user devices upon a request by the user devices (described in more detail with reference to FIG. 2). In accordance with at least one embodiment, the generation of the highlight clip can be provided as a notification or push application event to user devices viewing or consuming the content associated with the live stream data 116. In accordance with at least one embodiment, the model 118 may be a supervised machine learning algorithm or other suitable algorithm that is configured to utilize the structured data from the feature extractor 114 and live stream data 116 to generate a highlight clip of digital media content corresponding to an event. In accordance with at least one embodiment, the model 118 may be configured to further use historical data of previously generated highlight clips for digital media content correspond to a type of event. For example, the model 118 may be configured to maintain particular data points and data types of the structured data extracted by the feature extractor 114 and store the particular data points and data types in the highlight content database 122. The particular data points and data types of the structured data may be associated with a particular type of event that corresponds to the digital media content (e.g., a golf game, a basketball game, an eSport live stream, etc.). Historical data may also include data obtained from previous events of the same type (e.g., previous data obtained from a previous football game for use in comparing to data obtained for a current football game) such as historical crowd noise information, historical statistics of players, teams, or competitors, etc.

Figure 2:
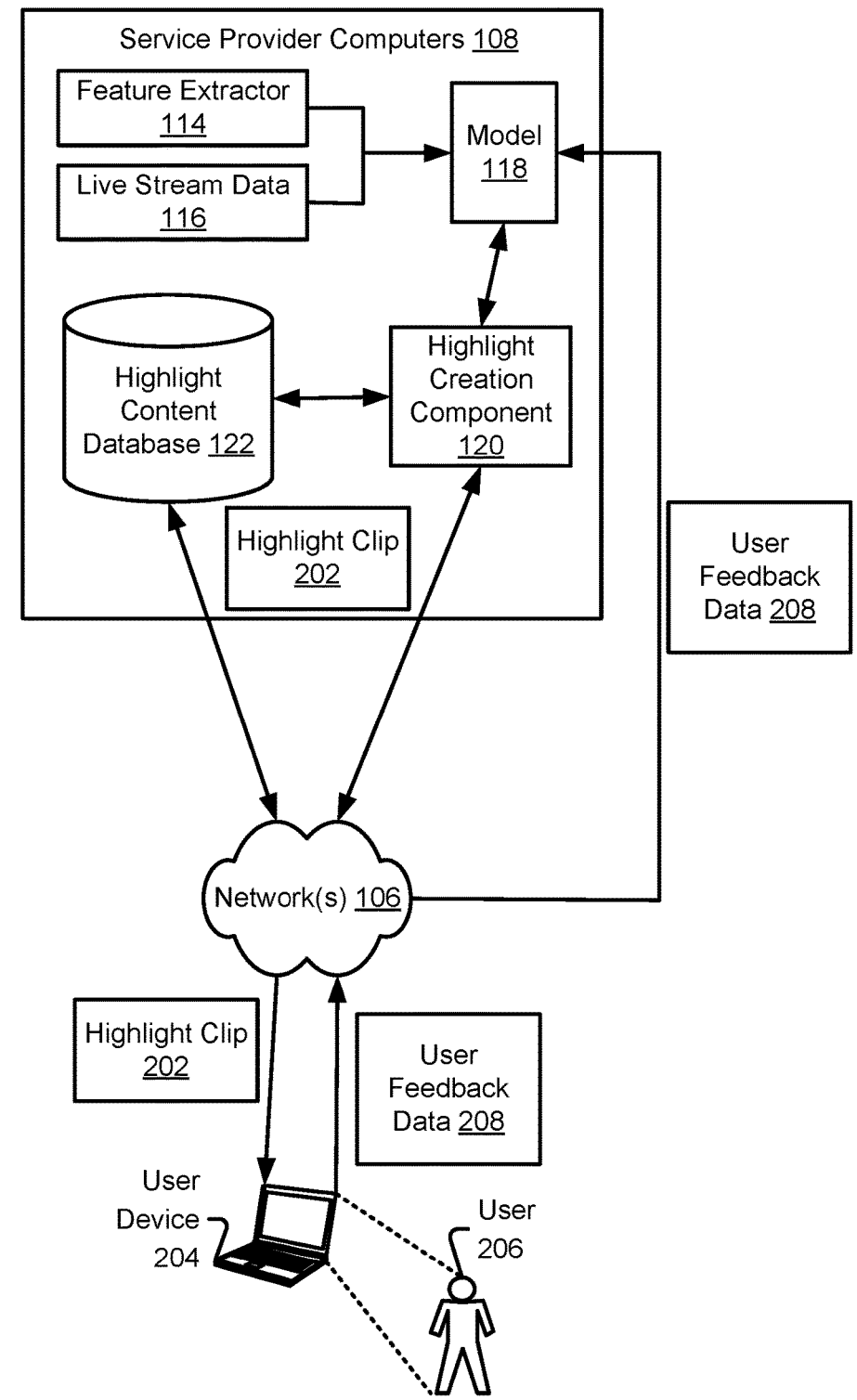
FIG. 2 illustrates an example workflow for a highlight feature in accordance with at least one embodiment.

FIG. 2 illustrates an example workflow for a highlight feature in accordance with at least one embodiment. The workflow 200 of FIG. 2 may be continued from the workflow 100 of FIG. 1. In workflow 200, the service provider computers 108 may be configured to receive and process requests for a highlight clip 202 by a user device 204 based on input from a user 206. The service provider computers 108 may be configured to transmit the highlight clip 202 for presentation by the user device 204 absent any input or highlight clip request from user 206. For example, for a given digital media content that corresponds to an event the service provider computers 108 may be configured to present a link or hyper link in a user interface of user device 204 that presents the highlight clip 202 for a period of time (e.g., notify the user 206 of the highlight clip 202 generated for the digital media content of an event for a five minutes or until the next highlight clip is generated for the same digital media content of the event).

The highlight clip 202 may be transmitted to the user device 204 for presentation to the user 206 via an associated user interface subsequent to generation of the highlight clip 202 by the highlight creation component 120 to coincide with the presentation of the digital media content for the event still being presented or in response to a request from the user device 204 which may be fulfilled by the highlight content database 122. In workflow 200 user feedback data 208 may be provided from the user device 204 to the model 118 for updating the model 118. For example, an interaction with the highlight clip 202 or a non-interaction or viewing of the highlight clip 202 may be an important data point that can be utilized by the service provider computers 108 in updating the model 118 for subsequent highlight clip generation. The user feedback data 208 may also be used to identify user preferences for highlight clips. For example, information that a user 206 only views highlight clips that include injuries to players may be used to update a user preference for the user 206 and tailor the generated highlights for an event or live event viewed by that user 206.

In accordance with at least one embodiment, the service provider computers 108 may receive the application input information from the user device 204 in response to the user 206 interacting with an application of the user device 204 or with the user device 204 itself. For example, the user 206 may interact with an application of the user device 204 to periodically rewind and replay the highlight clip 202 or portions of the highlight clip 202. As described herein, the application input information may be used by the model 118 as a data point or signal to generate a highlight clip for a subsequent and similar occurrence or activity in a digital media content for an event. In embodiments, the service provider computers 108 may receive user identification or device identification from the third party computers 110 that correspond to the third party computers 110 providing the digital media content of the event associated with the event audio data and video data 112. In accordance with at least one embodiment, the user identification (user ID) or device identification (device ID) can be used by the service provider computers 108 to map or otherwise identify a particular user for generating and transmitting the highlight clip 202.

In embodiments, the service provider computers 108 may be configured to receive or otherwise obtain the user ID or device ID from a request to view the highlight clip 202 from user device 204 and user 206. For example, the user 206 may login to an application provided by the service provider computers to provide a user ID in order to request the highlight clip 202. The device ID for the user device 204 may be obtained from the request for the highlight clip 202 or from the login information provided by the user 206 when requesting the highlight clip 202. In accordance with at least one embodiment, the service provider computers 108 may be configured to be a content creator (e.g., generate the digital media content that corresponds to an event being viewed by user 206). In configurations where the service provider computers 108 are also content providers, the user 206 may use the user device 204 to provide login credentials such as a user ID or device ID to view the content. As described herein, the service provider computers 108 may be configured to maintain a mapping of user IDs or device IDs to particular user accounts which include information such as user preferences, device information, or user feedback data 208. The user accounts or information associated with a user 206 maintained by the service provider computers 108 may be used to identify an appropriate device and channel with which to transmit the highlight clip 202. For example, a particular communication channel and protocol may be utilized if the device ID for user device 204 corresponds to a smart television as opposed to another communication channel and protocol that would be used if the device ID for user device 204 corresponded to a mobile device. In embodiments, the user preferences can indicate previous selection of after effects or other modifications to highlight clips that were previously provided to user 206. The service provider computers 108, model 108, and highlight creation component 120 may modify or otherwise alter highlight clip 202 prior to transmitting the highlight clip 202 to the user device 204 for consumption by user 206 based on the user preferences. As described in more detail with reference to FIG. 3, the user preferences or other information in a user account for a user 206 may be used to generate recommended highlight clips. The user preferences derived from the user accounts or information associated with a user 206 maintained by the first service provider computers 108 may be used to select and transmit appropriate highlight clips like highlight clip 202 to user device 204. For example, the user preferences may indicate that the user 206 only views content associated with a particular sports team. This data point may be used by the highlight creation component 120 when generating and recommending highlight clips 202 to the user 206.

Figure 3:
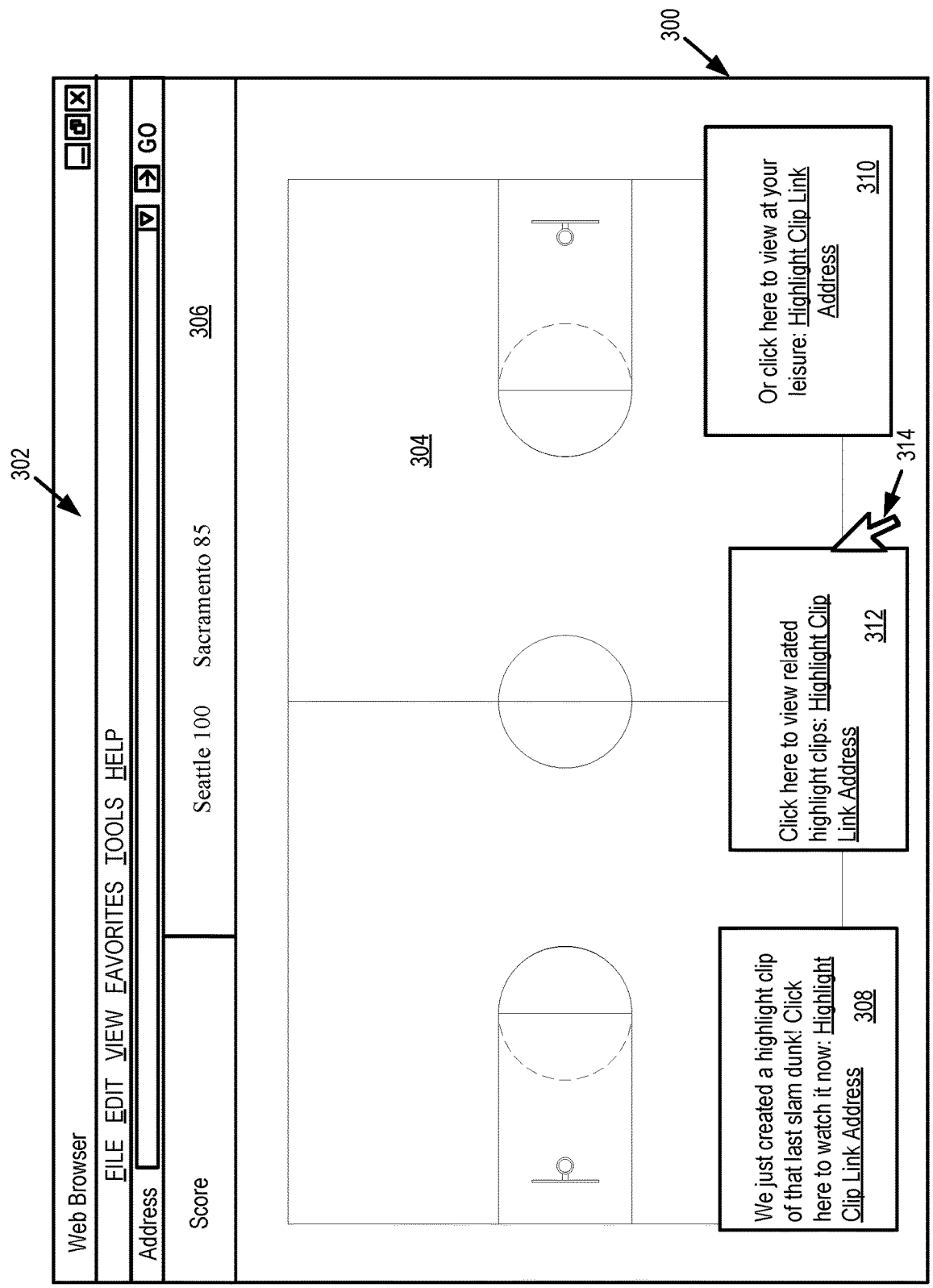
FIG. 3 illustrates an example user interface for presenting highlight clips for digital media content that corresponds to an event generated by the highlight feature in accordance with at least one embodiment.

FIG. 3 illustrates an example user interface for presenting highlight clips for digital media content that corresponds to an event generated by the highlight feature in accordance with at least one embodiment. FIG. 3 includes a user interface 300 presented by a web browser 302. The user interface 300 is depicted as presenting a basketball game 304 as well as a current score 306 for the basketball game 304. In embodiments, the service provider computers implementing the highlight feature may provide a highlight clip for the digital media content that corresponds to the basketball game 304 as it is on-going or not complete or finished. In the user interface 300 a user is presented with multiple highlight clip options including a recently created highlight clip 308 for the basketball game 304, a link or hyper link to view the created highlight clip 308 at a later time 310, and recommended highlight clips 312. In accordance with at least one embodiment, the service provider computers may generate recommendations that include highlight clips from a current event being viewed by a user (e.g., basketball game 304) but also highlight clips from similar events (other basketball games) or similar type of highlight clips (injury highlight clips, last minute goals or shots, etc.). A user may interact with the provided highlight clips 308, 310, or 312 using an input/output device such as a mouse 314 of the user device presenting the web browser 302.

In accordance with at least one embodiment, the service provider computers may be configured to generate the recommended highlight clips 312 based on user preferences for a user viewing the digital media content that corresponds to the event (basketball game 304). For example, a user viewing the basketball game 304 may historically interact with highlight clips that correspond to player injuries or player ejections by referees. The model implemented by the service provider computers can use the user preference or historical interaction by the user as a data point in determining whether a highlight clip of a particular occurrence during the basketball game 304 should be generated and provided to the user viewing user interface 300. The recommended highlight clips 312 may include similar types of highlight clips that would be preferred by the user (e.g., injuries or player ejections) from other basketball games going on simultaneously as the basketball game 304 or from previous basketball games with the same participating players, teams, or venue.

In accordance with at least one embodiment, the recommended highlight clips 312 may be generated by the service provider computers based at least in part on aggregate user interactions with highlight clips for other digital media content corresponding to other events of the same type (e.g., highlight clips generated for other basketball games similar to basketball game 304). The service provider computers may generate the recommended highlight clips 312 based at least in part on similar demographic information between users viewing the same event (basketball game 304) as indicated in the account information that is maintained and identified by the service provider computer using a user ID or device ID as described in FIG. 2. A device identifier received by the service provider computers may be used to apply effects or otherwise modify the highlight clips 308, 310, and 312 to conform to device capabilities such as by reducing a screen resolution to conform to a certain pixel size available for user interface 300.

Figure 4:
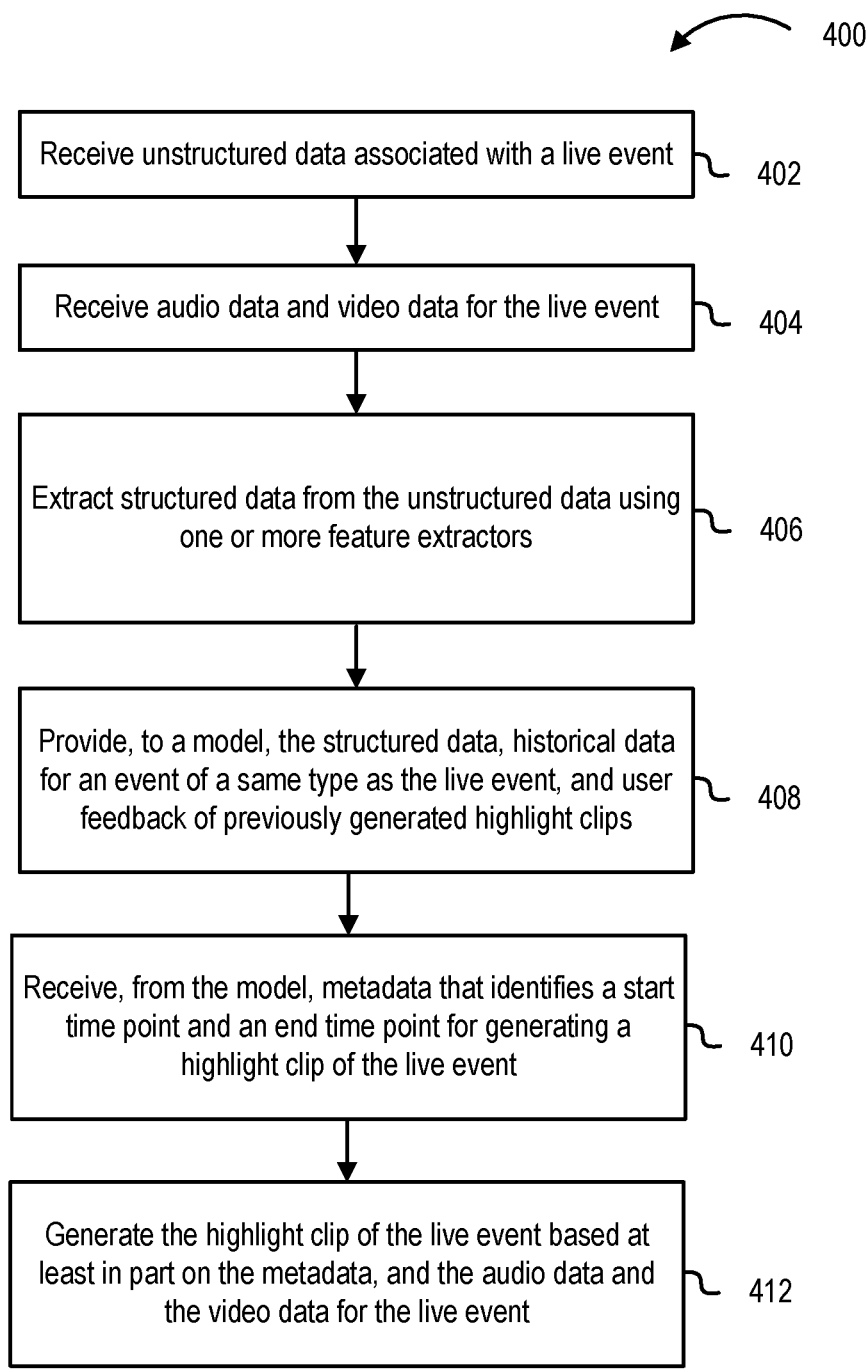
FIG. 4 illustrates a flow diagram of a process for a highlight feature in accordance with at least one embodiment.
Figure 5:
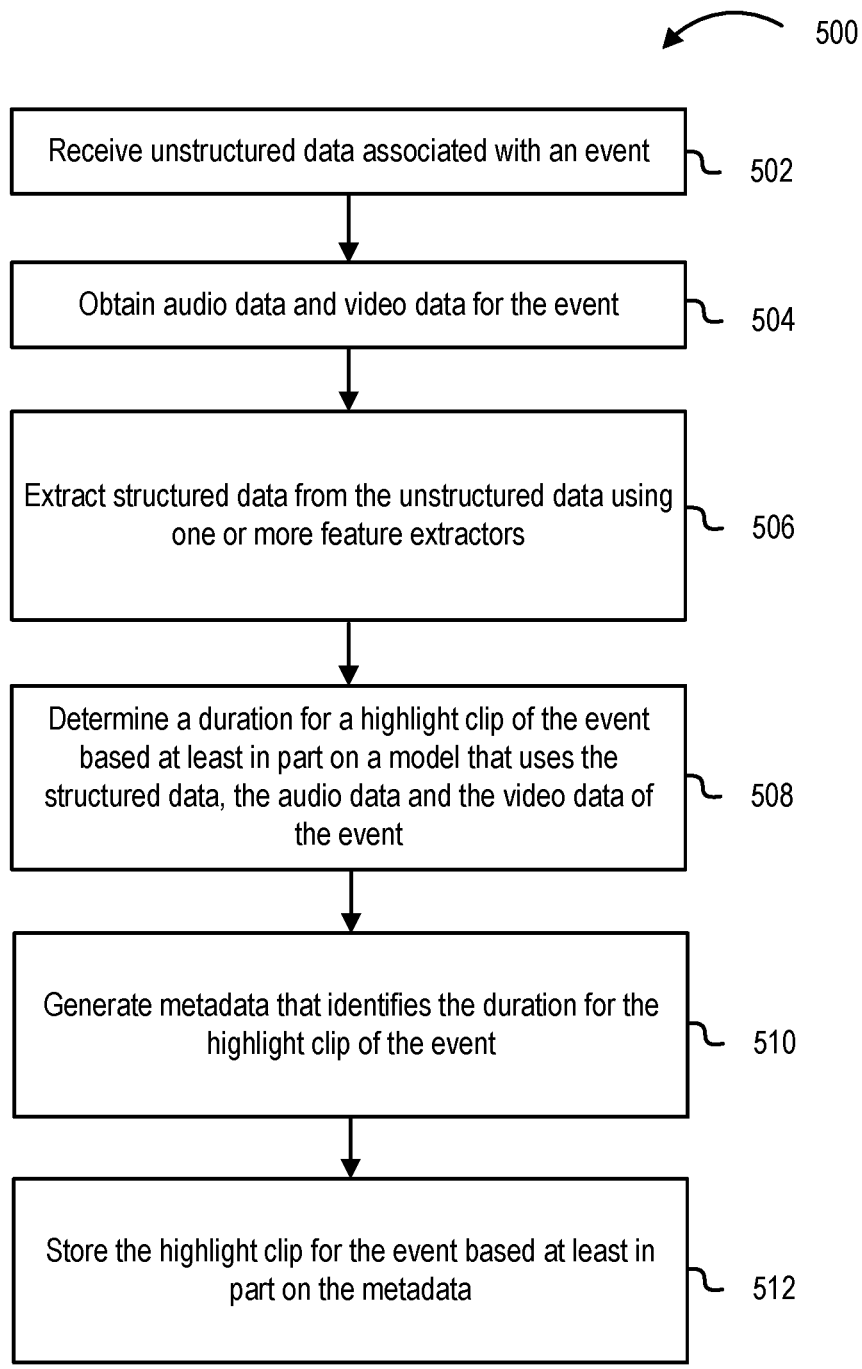
FIG. 5 illustrates a flow diagram of a process for a highlight feature in accordance with at least one embodiment.

FIGS. 4 and 5 illustrate example flow charts for highlight features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 6:
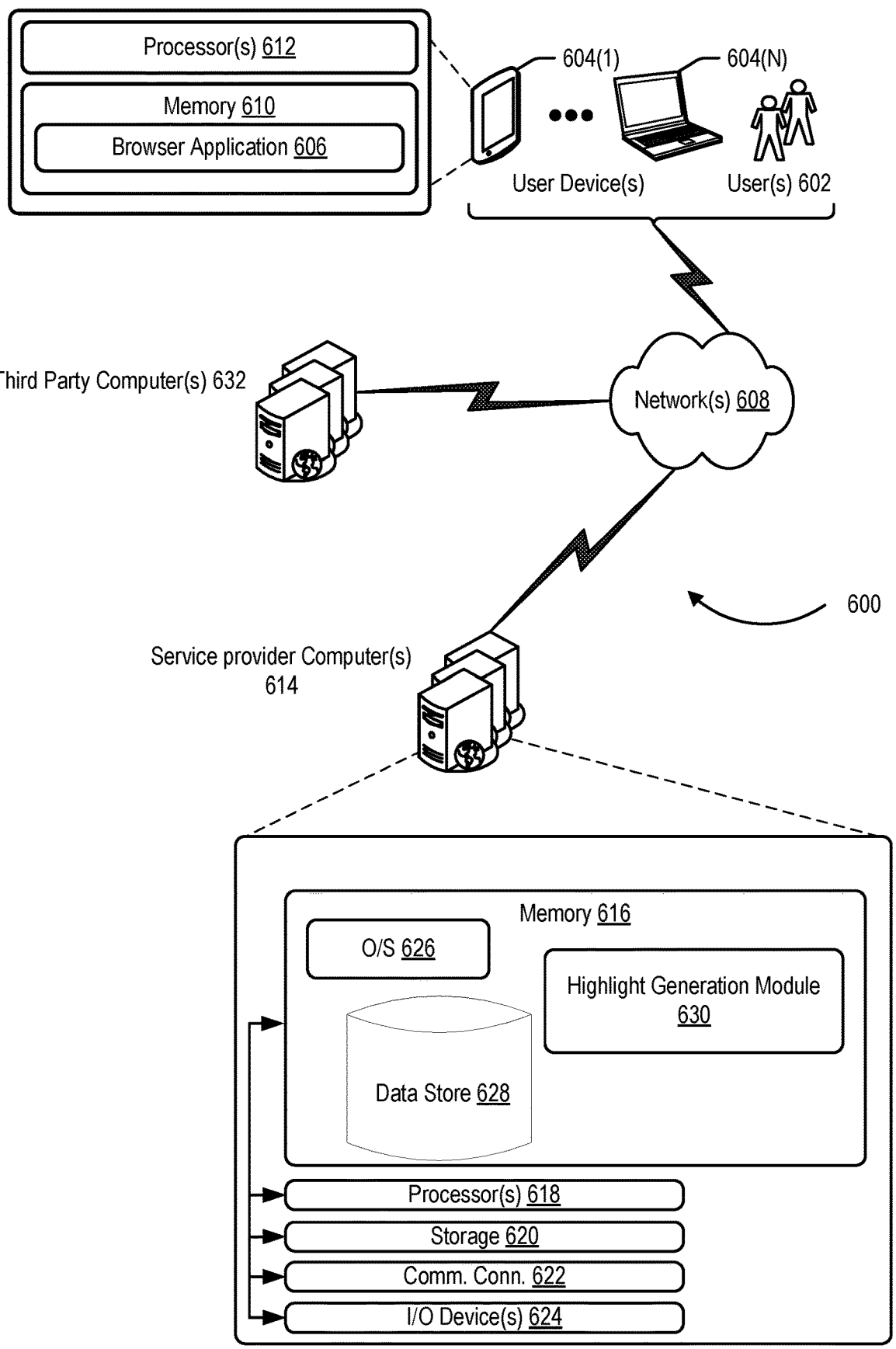
FIG. 6 illustrates an example architecture for implementing a highlight feature as described herein that includes one or more service provider computers, a user device, and/or one or more third party computers connected via one or more networks in accordance with at least one embodiment.

In some examples, service provider computers (service provider computers 108 and 614) utilizing at least the highlight generation module 630 depicted in FIGS. 1, 2, and 6 may perform the processes 400 and 500 of FIGS. 4 and 5. In FIG. 4, the process 400 may include receive unstructured data associated with a live event at 402. As described herein, the unstructured data may include social media trend information, real-time sport statistic information, crowd noise information, operator action information, or application input information. The process 400 may include receiving audio data and video data for the live event at 404. The audio data and the video data may be for digital media content that corresponds to the live event, a recording of the live event, or a live streaming of the event. The process 400 may include extracting structured data from the unstructured data using one or more feature extractors at 406. In embodiments, the service provider computers may utilize a particular feature extractor of the one or more feature extractors that is configured to interact and extract structured data from a particular type of unstructured data. For example, a particular feature extractor may be utilized to extract structured data from unstructured data of social media trend information whereas another particular feature extractor may be utilized to extract structured data from unstructured data of operator action information.

The process 400 may include providing, to a model, the structured data, historical data for an event of a same type as the live event, and user feedback of previously generated highlight clips at 408. The process 400 may include receiving, from the model, the metadata that identifies a start time point and an end time point for generating a highlight clip of the event at 410. In accordance with at least one embodiment, the model may be configured to utilize one or more thresholds for comparing each different type of the structured data to utilize when determining the metadata. For example, one threshold may be used to compare crowd noise information to so as to determine whether the received crowd noise information is an appropriate signal for generating a highlight clip for the digital media content that corresponds to the event (e.g., if the crowd noise decibel level of the crowd noise information exceeds the threshold decibel level).

In accordance with at least one embodiment, the service provider computers may maintain a plurality of thresholds for each type of structured data which can be selected based on the type of the event that is associated with the unstructured data. For example, the service provider computers may use a particular threshold for analyzing the crowd noise information associated with a football game and another particular threshold for analyzing crowd noise information associated with a golf match or tennis match. In another example, the service provider computers may use a particular threshold for analyzing social media trends associated with an entertainment event such as an awards show or a royal wedding. The process 400 may include generating the highlight clip of the live event based at least in part on the metadata, and the audio data and the video data for the live event or digital media content of the live event at 412. The highlight clip may be configured for presentation via a user interface.

In accordance with at least one embodiment, the service provider computers may transmit the highlight clip to a user interface within a certain time period of the occurrence or activity that is associated with the signal for generating the highlight clip (e.g., within one-second, within one minute, etc.) or in real-time. The service provider computers may be configured to provide the highlight clip for a certain amount of time, such as five minutes, or until the next highlight clip for the digital media content that corresponds to the event is generated. As described herein, a user may use a user device to request highlight clips that were previously generated. For example, they may search for highlight clips associated with a particular event and be presented with all the highlight clips generated by the service provider computers for that event.

In accordance with at least one embodiment, the service provider computers may be configured to modify or update the highlight clip prior to transmitting the highlight clip to a user device of a user. For example, the highlight clip may be altered or updated based at least in part on aggregate user input that identifies a type of modification to the highlight clip that the aggregate users requested. The aggregate user base may have, after receiving the highlight, provided input to implement a slow-motion effect for the highlight clip, or requested another camera angle of the occurrence in the event for the highlight clip to focus on when it is generated by the service provider computers. In accordance with at least one embodiment, the service provider computers may alter or update the highlight clip based on user preferences of the user that is going to receive or view the highlight clip. User preferences may be determined by the service provider computers in response to user interactions or non-interactions with previously generated and transmitted highlight clips as well as input that indicates requested modifications such as fast playback or color saturation. In accordance with at least one embodiment, the service provider computers may be configured to maintain the structured data and type of event with the generated highlight clips for subsequent analysis by the model to determine a success rate of interaction by users of transmitted highlight clips. This information and association of data used to generate a highlight clip can be used to further update the model for subsequent highlight clip generation.

The process 500 may include receiving unstructured data associated with an event at 502. The process 500 may include obtaining audio data and video data for the event at 504. In accordance with at least one embodiment, the service provider computers may receive, request, or otherwise obtain the unstructured data from one or more third party computers using application program interface calls to the third party computers or applications of the third party computers. The process 500 may include extracting structured data from the unstructured data using one or more feature extractors at 506. The process 500 may include determining a duration for a highlight clip of the event based at least in part on a model that uses the structured data, the audio data and the video data of the event at 508. In accordance with at least one embodiment, the model may also use information that identifies a number of viewers viewing the event associated with the unstructured data as a metric or data point when determining the duration.

The process 500 may include generating metadata that identifies the duration for the highlight clip of the event at 510. In embodiments, the metadata may also identify or include information associated with the event or highlight clip such as by including information which describes the event, includes information about the event such as participating teams, scores, player statistics, etc., a type of highlight clip (e.g., long touchdown pass, high flying basketball dunk, etc.), and a length or duration of the highlight clip. The process 500 may include storing the highlight clip for the event based at least in part on the metadata at 512. As described herein, the service provider computers may be configured to retrieve and transmit the generated highlight clip in response to a request from a user device of a user. In embodiments, the service provider computers may also transmit recommended highlight clips that are similar to the requested highlight clip or other highlight clips that were generated for the same event that the user can browse through and view.

FIG. 6 illustrates an example architecture for implementing the highlight feature, in accordance with at least one embodiment. In architecture 600, one or more users 602 (e.g., customers, users, consumers, etc.) may utilize user computing devices 604(1)-(N) (collectively, user devices 604) to access a browser application 606 or a user interface (UI) accessible through the browser application 606, via one or more networks 608 to request content including digital media content or streaming content associated with events such as sports games or eSports games. In embodiments, the one or more users 602 may utilize user computing devices 604(1)-(N) to access the browser application 606 or a UI accessible through the browser application 606, via one or more networks 608, to request content including media content from third party computers 632 or service provider computers 614. The one or more users 602 may utilize user computing devices 604(1)-(N) to access the browser application 606 or a UI accessible through the browser application 606, via one or more networks 608, to request or receive highlight clips associated with the content. The "browser application" 606 can be any browser control or native application that can access and display a network page or other information such as a user interface of a native software application for enabling the selection or interaction of content and requesting or receiving highlight clips for the content or associated content. A native software application may include an application or program that has been developed for use on a particular platform (such as an operating system) or a particular device (such as a particular type of mobile device or user device 604). In embodiments, the user device 604 may include one or more components for enabling the user 602 to interact with the browser application 606.

The user devices 604 may include at least one memory 610 and one or more processing units or processor(s) 612. The memory 610 may store program instructions that are loadable and executable on the processor(s) 612, as well as data generated during the execution of these programs. Depending on the configuration and type of the user devices 604, the memory 610 may be volatile (such as random access memory (RAM)) and/or non-volatile (such as read-only memory (ROM), flash memory, etc.). The user devices 604 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 604. In some implementations, the memory 610 may include multiple different types of memory, such as static random access memory (SRAM), dynamic random access memory (DRAM), or ROM.

Turning to the contents of the memory 610 in more detail, the memory 610 may include an operating system and one or more application programs or services for implementing the features disclosed herein.

The architecture 600 may also include one or more service provider computers 614 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 614 may implement or be an example of the service provider computer(s) described herein with reference to FIGS. 1-5 and throughout the disclosure. The one or more service provider computers 614 may also be operable to provide site hosting, media streaming services, computer application development, and/or implementation platforms, combinations of the foregoing, or the like to the one or more users 602 via user devices 604 as well as receive media streaming content or generate content for the one or more users 602 via user device 604.

In some examples, the networks 608 may include any one or a combination of many different types of networks, such as cable networks, the Internet, wireless networks, cellular networks, and other private and/or public networks. While the illustrated examples represents the users 602 communicating with the service provider computers 614 over the networks 608, the described techniques may equally apply in instances where the users 602 interact with the one or more service provider computers 614 via the one or more user devices 604 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 614 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 614 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 614 may be in communication with the user device 604 via the networks 608, or via other network connections. The one or more service provider computers 614 may include one or more servers, perhaps arranged in a cluster or as individual servers not associated with one another.

In one illustrative configuration, the one or more service provider computers 614 may include at least one memory 616 and one or more processing units or processor(s) 618. The processor(s) 618 may be implemented as appropriate in hardware, computer-executable instructions, firmware, or combination thereof. Computer-executable instruction or firmware implementations of the processor(s) 618 may include computer-executable or machine-executable instructions written in any suitable programming language to perform the various functions described when executed by a hardware computing device, such as a processor. The memory 616 may store program instructions that are loadable and executable on the processor(s) 618, as well as data generated during the execution of these programs. Depending on the configuration and type of the one or more service provider computers 614, the memory 616 may be volatile (such as RAM) and/or non-volatile (such as ROM, flash memory, etc.). The one or more service provider computers 614 or servers may also include additional storage 620, which may include removable storage and/or non-removable storage. The additional storage 620 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 616 may include multiple different types of memory, such as SRAM, DRAM, or ROM.

The memory 616, the additional storage 620, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 616 and the additional storage 620 are all examples of non-transitory computer storage media. Additional types of non-transitory computer storage media that may be present in the one or more service provider computers 614 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 614. Combinations of any of the above should also be included within the scope of non-transitory computer-readable media.

The one or more service provider computers 614 may also contain communication connection interface(s) 622 that allow the one or more service provider computers 614 to communicate with a data store, another computing device or server, user terminals, and/or other devices on the networks 608. The one or more service provider computers 614 may also include I/O device(s) 624, such as a keyboard, a mouse, a pen, a voice input device, a touch input device, a display, speakers, a printer, etc.

Turning to the contents of the memory 616 in more detail, the memory 616 may include an operating system 626, one or more data stores 628, and/or one or more application programs or services for implementing the features disclosed herein including the highlight generation module 630. In accordance with at least one embodiment, the highlight generation module 630 may be configured to at least generate metadata or a metadata file that indicates a duration for a highlight clip. In embodiments, the highlight generation module 630 may include a model that uses structured data extracted by feature extractors from unstructured data and audio and video data to determine whether a signal indicates that a highlight clip should be generated for digital media content corresponding to an event. The highlight generation module 630 may aggregate the structured data to verify or correlate multiple data points to determine that the metadata should be generated for an occurrence or activity within an event. The highlight generation module 630 may utilize one or more thresholds with which to compare the structured data to determine whether a signal indicative of generating metadata for an event is appropriate. The highlight generation module 630 may be configured to maintain generated highlight clips in the data store 628 for subsequent retrieval and transmission to user device 604 and user 602. The highlight generation module 630 may be configured to update, alter, or modify the generated highlight clips based on aggregate user input, user preferences, or user input from a content requesting using. The highlight generation module 630 may be configured to maintain user account information associated with a user ID or device ID for transmitting the highlight clips to the user device 604 and user 602 as well as identifying user preferences for the highlight clips.

The architecture of FIG. 6 also includes third party computers 632 that may further include processors, memory, and a browser application similar to service provider computers 614 and user device 602. In embodiments, the third party computers 632 may be configured to transmit or otherwise provide content such as streaming content to user devices 604 as well as unstructured data associated with the content to service provider computers 614 via networks 608. In embodiments, the third party computers 632 may be configured to transmit information about the streaming content and the user devices consuming the content to service provider computers 614 via networks 608.

Figure 7:
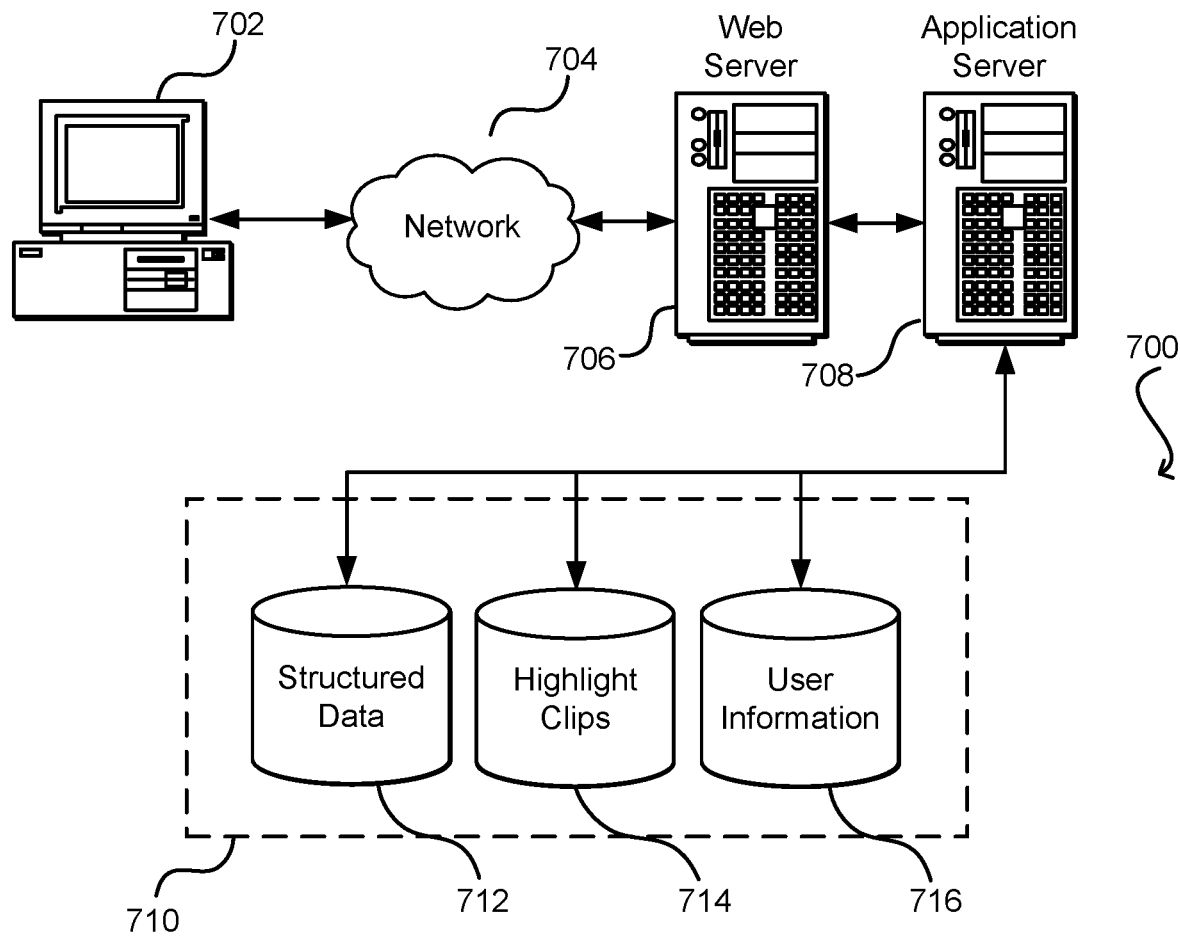
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing structured data 712 and user information 716, which can be used to serve content for the production side as well as update the model for generating the metadata for subsequent highlight clips. For example, the structured data 712 may be associated with particular generated highlight clips and serve as important data points or metrics for updating the model and analyzing subsequent structured data received from data sources (third party computers). The user information 716 may include user feedback (e.g., click rates, highlight clip consumption information, etc.) that can also be used to update the model for analyzing subsequent structured data as well as audio and video data for an event. The data store also is shown to include a mechanism for storing highlight clips 714, which can be used for reporting, analysis, or other such purposes such as transmitting the highlight clips to user devices for presentation via a user interface. As described herein, the highlight feature may include modifying the highlight clip prior to transmitting the highlight clip to a user device such as by applying an effect (e.g., slow motion) or providing additional information (scores for a game, player information, a description for the highlight clip, etc.). It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system and from a third party computer, unstructured data associated with a live event;
receiving, by the computer system and from the third party computer, audio data and video data for the live event;
extracting, by the computer system, structured data from the unstructured data using one or more feature extractors, a feature extractor of the one or more feature extractors configured to be utilized with a type of data associated with a portion of the unstructured data;
providing, by the computer system and to a model, the structured data, historical data for an event of a same type as the live event, and user feedback of previously generated highlight clips;
receiving, by the computer system and from the model, metadata that identifies a start time point and an end time point for generating a highlight clip of the live event, the model configured to utilize one or more thresholds for comparing each different type of the structured data to determine the metadata, and wherein a threshold of the one or more thresholds is selected by the model based at least in part on a type of the live event;
generating, by the computer system, the highlight clip of the live event based at least in part on the metadata, and the audio data and the video data for the live event; and
transmitting, by the computer system and to a user device, the highlight clip for presentation during the live event via a user interface of the user device and within a certain time period of receiving the unstructured data.

2. The computer-implemented method of claim 1, wherein the unstructured data includes at least one of social media trend information, real-time sport statistic information, crowd noise information, operator action information, or application input information.

3. A computer-implemented method, comprising:
receiving, by a computer system, unstructured data associated with an event;
obtaining, by the computer system, audio data and video data for the event;
extracting, by the computer system, structured data from the unstructured data using one or more feature extractors, the one or more feature extractors configured to be utilized with a type of data associated with a portion of the unstructured data;
determining, by the computer system, a duration for a highlight clip of the event based at least in part on a model that uses the structured data, the audio data and the video data of the event;
generating, by the computer system, metadata that identifies the duration for the highlight clip of the event based at least in part on the model, the model configured to utilize one or more thresholds for comparing each different type of the structured data to generate the metadata, and wherein a threshold of the one or more thresholds is selected by the model based at least in part on a type of the event;
storing, by the computer system, the highlight clip for the event based at least in part on the metadata; and
transmitting, by the computer system and to a user device, the highlight clip for presentation via a user interface of the user device and within a certain time period of receiving the unstructured data.

4. The computer-implemented method of claim 3, wherein the model is configured to aggregate the structured data to determine the duration of the highlight clip.

5. The computer-implemented method of claim 3, further comprising transmitting, by the computer system and to the user interface of the user device, the highlight clip in response to a request from the user device.

6. The computer-implemented method of claim 5, further comprising updating, by the computer system, the model based at least in part on input from the user device requesting the highlight clip.

7. The computer-implemented method of claim 6, further comprising modifying, by the computer system, the highlight clip based at least in part on the input.

8. The computer-implemented method of claim 3, wherein receiving the unstructured data includes transmitting a request via an application program interface call to a third party computer.

9. The computer-implemented method of claim 3, wherein the metadata includes information that identifies a type of the highlight clip, a rating associated with the highlight clip, or a description of the highlight clip.

10. The computer-implemented method of claim 3, wherein the model further uses information that identifies a number of viewers viewing the event for determining the duration of the highlight clip.

11. A computer system comprising:
a memory configured to store computer-executable instructions; and
a processor in communication with the memory configured to execute the computer-executable instructions to at least:
receive unstructured data associated with an event;
obtain audio data and video data for the event;
extract structured data from the unstructured data using one or more feature extractors, the one or more feature extractors configured to be utilized with a type of data associated with a portion of the unstructured data; and
generate metadata that identifies a duration for a highlight clip of the event based at least in part on a model that uses the structured data, the audio data and the video data of the event, and one or more thresholds for comparing each different type of the structured data, wherein a threshold of the one or more thresholds is selected by the model based at least in part on a type of the event.

12. The computer system of claim 11, wherein the processor is further configured to generate the highlight clip based at least in part on the metadata.

13. The computer system of claim 12, wherein the processor is further configured to generate a recommendation that includes the highlight clip based at least in part on first information that identifies user preferences derived from previously viewed highlight clips.

14. The computer system of claim 13, wherein generating the recommendation is further based at least in part on second information that identifies associated portions of structured data using the audio data and the video data of the event.

15. The computer system of claim 12, wherein the processor is further configured to modify the highlight clip based at least in part on aggregate user input that identifies a type of modification to apply to the highlight clip.

16. The computer system of claim 11, wherein the processor is further configured to select a particular model of one or more models based at least in part on the type of the event or a geographic location of the event.

17. The computer system of claim 16, wherein the processor is further configured to:
maintain the particular model and the structured data; and
associate user input from a user device viewing the highlight clip with the particular model and the structured data.

* * * * *